United States Patent [15] 3,692,255

Von Behren [45] Sept. 19, 1972

[54] BELT DRIVEN TAPE CARTRIDGE

[72] Inventor: Robert A. Von Behren, Mendota, Minn.

[73] Assignee: Minnesota Mining and Manufacturing Company, St. Paul, Minn.

[22] Filed: June 17, 1971

[21] Appl. No.: 154,039

[52] U.S. Cl. ....242/192
[51] Int. Cl. ....G11b 15/32
[58] Field of Search......242/192, 198, 199, 200, 202, 242/210

[56] References Cited

UNITED STATES PATENTS

| | | | |
|---|---|---|---|
| 3,297,268 | 1/1967 | Sawazaki | 242/192 |
| 3,305,186 | 2/1967 | Burdorf et al. | 242/192 |
| 3,467,338 | 9/1969 | Breuer | 242/192 |
| 3,620,473 | 11/1971 | Stone | 242/192 |

FOREIGN PATENTS OR APPLICATIONS

| | | | |
|---|---|---|---|
| 414,714 | 8/1946 | Italy | 242/192 |
| 36,634 | 1/1923 | Norway | 242/192 |
| 698,262 | 1/1931 | France | 242/192 |
| 751,075 | 6/1944 | Germany | 242/192 |
| 860,272 | 2/1961 | Great Britain | 242/192 |
| 1,089,988 | 9/1960 | Germany | 242/192 |

*Primary Examiner*—Leonard D. Christian
*Attorney*—Kinney, Alexander, Sell, Steldt & Delahunt

[57] ABSTRACT

A two-reel tape cartridge in which a flexible belt having a coefficient of elasticity in the range from 0.01 to 0.25 m./nt.m. and a pretension of at least 1.6 nt. extends around guide rollers adjacent the reels and a driving roller between the reels and contacts the tape on the reel hubs. Rotation of the driving roller causes the belt to drive the tape reels to tension the tape and to move the tape between the reels. The cartridge construction permits low power bidirectional drive and rapid acceleration and deceleration of the tape by a single reversible drive motor.

12 Claims, 6 Drawing Figures

INVENTOR.
ROBERT A. VON BEHREN
BY Kinney, Alexander, Sell, Steldt & DeLaHunt
ATTORNEYS INVENTOR.
ROBERT A. VON BEHREN
BY Kinney, Alexander, Sell, Steldt & DeLaHunt
ATTORNEYS

BELT DRIVEN TAPE CARTRIDGE

FIELD OF THE INVENTION

The present invention relates to a two-reel tape cartridge in which a flexible elastic belt contacts the tape on the reel hubs whereby movement of the belt causes movement of the tape between the reels.

BACKGROUND OF THE INVENTION

Magnetic recording tape has long been supplied in cartridges for ease of handling and use. In general, such tape cartridges include a pair of spaced reels between which the tape is transferred by a capstan drive, and the reels are also driven through slip clutches to produce tension in the tape. Since the reels are overdriven, such cartridges inefficiently utilize the driving power supplied and, furthermore, rapid acceleration and deceleration of the tape is not available. For this reason, in applications where rapid acceleration and deceleration of the tape are required (i.e., computers), open reel-to-reel vacuum loop tape transports which produce loose loops in the tape have been utilized. Such systems are complex and sacrifice the convenience of a tape cartridge.

Belt driven tape transports wherein the driving belt contacts the tape on the reel hubs are known in the prior art as exemplified by U. S. Pat. Nos. 2,658,398; 3,125,311; 3,154,308; 3,305,186; and 3,514,049. In this type of transport, driving of the belt drives the reels and moves the tape between the reels resulting in a more efficient utilization of the driving power supplied. Preferably the belt is separated from the tape at guide rollers and across the magnetic transducer to prevent any difference in elasticity between the belt and the tape from affecting the movement of the tape. Tension in the tape is then produced by creating a greater tension and, therefore, a higher speed in the belt at the take-up reel than at the supply reel. However, the prior art devices have utilized multiple drive and/or brake connections with the driving belt and/or the reels to provide the desired tape tension and uniformity of tape drive. The complexity of such devices has generally precluded enclosure of the reels and the tape path in a cartridge. Furthermore, the prior art does not teach the construction of a belt driven tape cartridge having bidirectional drive and rapid acceleration and deceleration capabilities.

SUMMARY OF THE INVENTION

In the two-reel tape cartridge of the present invention, a flexible belt having a coefficient of elasticity in the range from 0.01 to 0.25 m./nt.m. and a pretension of at least 1.6 nt. extends along a belt guide path around guide members positioned adjacent the reels and a driving roller positioned between the reels and contacts the tape on the reel hubs. The belt guide path defines an angle of wrap around the reel hubs of at least 60°. A predetermined frictional drag is applied on the belt moving along the belt guide path. Rotation of the driving roller causes the belt to drive the tape reels to tension the tape and to move the tape between the reels. The cartridge construction permits bidirectional drive and rapid acceleration and deceleration of the tape by a single reversible drive motor. Rapid reversal of the drive will rapidly reverse the tape movement without creating a loose loop in the tape since the tape tension upon reversal never goes through zero.

In the preferred embodiments hereinafter described, the tape is a magnetic recording tape. However, within the scope of the present invention the term "tape" includes microfilm, paper webs or any other elongated flexible web material which it may be desired to transport between a pair of reels.

THE DRAWING

Figure 1:
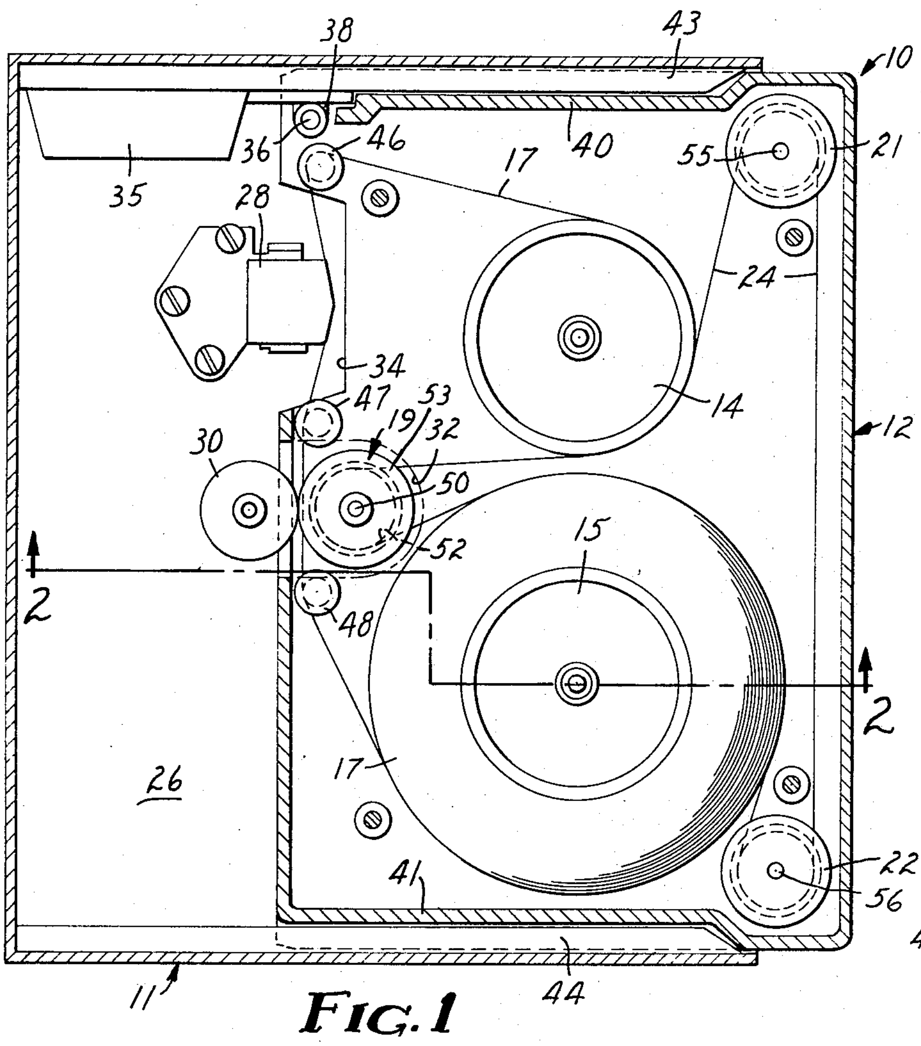
FIG. 1 is a top view of a belt driven tape cartridge constructed in accordance with the present invention partially in section and in position on a recording and/or reproducing machine.
Figure 3:
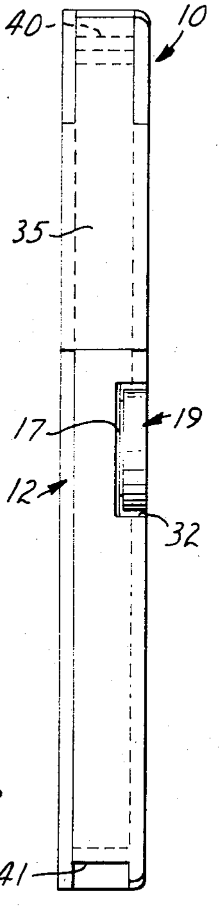
FIG. 3 is an edge view of the cartridge of FIG. 1.
Figure 2:
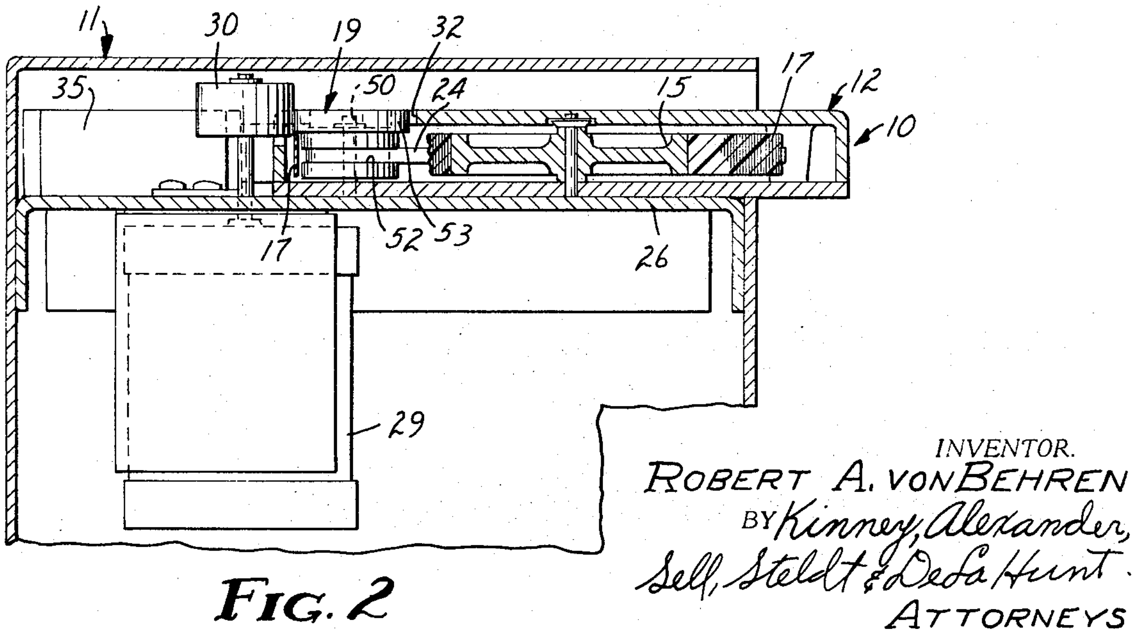
FIG. 2 is a cross-sectional view taken along line 2—2 of FIG. 1.

Referring now to FIGS. 1 through 3, there is illustrated the first embodiment of the tape cartridge, generally designated 10. In FIGS. 1 and 2 the cartridge 10 is shown in position in a recording and/or reproducing machine, generally designated 11, hereinafter referred to as a tape recorder. The tape recorder 11 comprises a support frame including a horizontal cartridge support deck 26 supporting a magnetic transducer 28 and in a depending manner supporting a reversible drive motor 29, the shaft of which extends through and carries a drive roller 30 above the support deck 26. Elongate guides 43 and 44 define the position for the cartridge 10 on the cartridge support deck 26. The cartridge includes a shell 12 defining a thin, generally rectangular enclosure within which are supported a pair of reel hubs 14 and 15, a length of tape 17, a belt driving roller 19, a pair of belt guide rollers 21 and 22, and a driving belt 24.

The cartridge shell 12 is formed with an opening 32 in its top wall and extending into one edgewall centrally of the length of the edgewall to provide access for the drive roller 30 of the tape recorder 11. The same edgewall of the cartridge shell is also formed with a cutaway portion 34 for access to the interior of the cartridge by the magnetic head 28. The cutaway portion 34 is normally covered by a door 35 which is pivoted on a stud 36 adjacent a corner of the cartridge and biased by a torsion spring 38 toward its closed position covering the cutaway portion 34. The opposed edgewalls 40 and 41 of the cartridge shell which are perpendicular to the edgewall thereof containing the cutaway portion 34 are recessed along a majority of their length to expose the base wall, and the elongate guides 43 and 44 in the recorder 11 are formed to fit over the exposed portions of the base wall of the cartridge shell to guide the cartridge 10 as it is inserted into the recorder 11. The door 35 of the cartridge shell 12 extends beyond its pivot stud 36 into the recessed portion of the adjacent edgewall 40 and the leading edge of the corresponding cartridge guide 43 in the tape recorder is beveled to pivot the door 35 to an open position against the bias of the torsion spring 38 as the cartridge is inserted into the machine.

The reel hubs 14 and 15 are supported by the cartridge shell 12 for free rotation about spaced parallel axes. The tape 17 is convolutely wound on the reel hubs in opposite directions about their axes. A tape guide path between the reel hubs is defined by three guide pins 46, 47 and 48, one positioned on each side of the cutaway portion 34 of the cartridge shell 12 to guide the tape from the reel hub 14 and across the cutaway portion, and one pin positioned at the edge of the drive roller opening 32 farthest removed from the cutaway portion 34 to guide the tape to the reel hub 15.

The belt driving roller 19 is supported for free rotation by a shaft 50 extending from the base wall of the cartridge shell 12. The belt driving roller is rotatable about an axis parallel to the axes of the reels 14 and 15 and is positioned on the center line of the cartridge between the reel hubs. It is formed with a smaller diameter portion which has a central circumferential belt guide slot 52 in horizontal alignment with the center line of the tape guide path and a larger diameter portion 53 extending into the drive roller opening 32 in the cartridge shell 12. The larger diameter portion 53 of the belt driving roller 19 extends over the tape path between the guide pins 47 and 48 to permit driving of the belt driving roller 19 by the drive roller 30 in the recorder 11 without contacting the tape 17.

The belt guide rollers 21 and 22 are supported on the cartridge shell by stationary shafts 55 and 56, respectively, for rotation about axes parallel to the axis of the belt driving roller 19. The belt guide rollers 21 and 22 and their support shafts 55 and 56 are constructed of materials which have a predetermined coefficient of friction to provide a predetermined frictional coupling between each guide roller and its support shaft for a purpose which will be hereinafter described. The belt guide rollers are positioned at opposite corners of the cartridge shell 12 along the edgewall thereof parallel to the edgewall formed with the cutaway portion 34. Each belt guide roller is formed with a central circumferential belt guide slot in horizontal alignment with the guide slot 52 in the belt driving roller 19. The belt driving roller 19 and the belt guide rollers 21 and 22 define a belt guide path having an angle of wrap of at least 60° at the periphery of the reel hubs 14 and 15.

The belt 24 is thin, continuous, flexible and elastic, it has a uniform cross-section area and it extends along the belt path around the belt driving roller 19 and the belt guide rollers 21 and 22 contacting the tape 17 on the reel hubs 14 and 15. It has a coefficient of elasticity in the range from 0.01 to 0.25 m./nt.m.

The length of the belt 24 is less than the length of the belt guide path so that when the belt is stretched into position along the guide path it will have an as installed tension or pretension of at least 1.6 mt. The angle of wrap of the belt guide path at the reel hubs of at least 60° provides the necessary contact between the belt and the tape wound on the reel hubs to assure frictional driving of the tape 17 and driving of the reel hubs 14 and 15 by the belt 24. The pretension in the belt provides the frictional engagement force between the belt guide rollers 21 and 22 and their respective support shafts 55 and 56, it provides the frictional engagement force between the belt and the tape and it presses the tape layers together to prevent slippage between the tape layers. The belt pretension must be adequate to permit rapid acceleration and deceleration of the tape without slippage. The belt is preferably chosen of a material having a coefficient of friction against the tape greater than that between the layers of tape so that any slippage will first occur between the layers of tape. Nearly any material of which the belt may be constructed will fulfill this criteria. Below a pretension of 1.6 nt. rapid deceleration may cause slippage between the layers of tape on the reel hubs and spilling of tape from the supply reel. As the pretension increases the power required to drive the belt increases and it is preferable that the pretension be below 7 nt. so that the driving power requirement will remain low.

Rotation of the belt driving roller 19 in a clockwise direction (as viewed in FIG. 1) by the drive roller 30 causes the belt to traverse its guide path in a clockwise direction and the tape 17 to move from the reel hub 14 to the reel hub 15, the reel hub 14 serving as a supply reel and the reel hub 15 serving as a take-up reel. The predetermined frictional coupling between the belt guide rollers 21 and 22 and their respective support shafts 55 and 56 applies a predetermined drag to the belt as it passes around the guide rollers, thereby increasing the tension in the belt as it passes around each of the guide rollers. This increased tension in the belt 24 increases the length of the belt, according to the elasticity of the belt, and thereby the speed at which the belt passes around the take-up reel 15 over that at which it passes around the supply reel 14. This increased speed causes tension in the tape 17 as well as the ability to take up any slack developed in the tape between the reel hubs.

The ability to take up slack in the tape is expressed as a ratio between the length of tape taken up to the length of tape passing any point along the tape path. To have the ability to take up tape and to apply tension in the tape, the take-up ratio must be some distinct positive quantity, in most applications preferably at least 0.001 m./m. The take-up ratio increases with increasing elasticity of the belt but it changes as the relative radii of the tape wound on the supply and take-up reels change. In passing around the tape wound on each of the reel hubs, the belt is turned through a lesser or greater radius depending upon the amount of tape wound on the reel hub. The speed of the outer surface of the belt contacting the tape on the reel hubs will be less than the average velocity of the belt at its center line, the difference being greater as the thickness of the belt is increased and as the radius of the tape wound on the reel hubs is decreased. With the radius of the tape wound on the take-up reel significantly less than that wound on the supply reel this velocity difference will be greater at the take-up reel than at the supply reel and it may negate the velocity difference in the belt induced by the guide rollers tensioning the belt between the supply and take-up reels, thereby causing the take-up ratio to become negative and tape to spill. It has been found that with 97.5 m. of 0.0025 cm. thick tape the take-up ratio will remain positive when the belt has an elasticity of 0.22 m./nt.m. only if the thickness of the belt is less than 6 percent of the radius of the reel hubs. As the elasticity of the belt decreases and as the volume of tape is increased, the minimum take-up ratio with a given belt decreases and the ratio of the maximum permissible belt thickness to the hub radius therefore decreases.

The material and cross-sectional dimensions of the belt should be chosen so that the take-up ratio will be positive. The belt acts as a spring and while the take-up ratio increases as the elasticity of the belt increases the acceleration and deceleration rate markedly decrease since it takes longer to take up the stretch in the belt. Furthermore, increased elasticity of the belt tends to increase undesirable short-term speed variations, known in the art as "jitter," in the belt and thereby in the tape. If the coefficient of elasticity of the belt is above 0.25 m./nt.m. belt "jitter" transferred to the tape may become undesirably high.

Since the belt driving roller 19 and the belt guide rollers 21 and 22 are symmetrical with respect to the reel hubs 14 and 15, reversal of the direction of rotation of the belt driving roller (i.e., counterclockwise as viewed in FIG. 1) will result in the same tape drive properties. Upon such reversal the direction of tape movement is reversed and while the differential tension in the belt is reversed the tape tension does not go through zero. Thus, reversal in the direction of tape movement may be effected without spilling tape.

In specific embodiments of the present invention utilizing approximately 97.5 m. of 0.0025 cm. thick and 0.63 cm. wide magnetic recording tape having a polyester backing, a pretension of 4.4 nt. was produced in various belts and a total drag of 0.28 nt. was produced in the belt guide rollers. With a belt having a coefficient of elasticity of 0.0125 m./nt.m. the tape acceleration rate was found to be 9,750 cm./sec.$^2$ from 0 to 25.5 cm./sec. with a take-up ratio of 0.0035 m./m. With a belt having a coefficient of elasticity of 0.22 m./nt.m. an acceleration of 610 cm./sec.$^2$ from 0 to 25.5 cm./sec. and a take-up ratio of 0.0625 m./m. were obtained. Belts having intermediate coefficients of elasticity had accelerations and take-up ratios falling between these values.

One specific embodiment of the present invention, utilizing approximately 97.5 m. of 0.0025 cm. thick and 0.63 cm. wide magnetic recording tape having a polyester backing, was constructed as illustrated in FIGS. 1 through 3 for use in conjunction with digital computers. For this application it was specified that the tape tension should be 0.55 nt., the take-up ratio should be 0.005 m./m., the tape acceleration and deceleration should be 5,080 cm./sec.$^2$ without tape spill from the reels, the maximum speed should be 600 cm./sec. and the jitter should be less than five percent. A cartridge was constructed with 4.128 cm. diameter reel hubs 14 and 15, the belt 24 was polyurethane having a thickness of 0.015 cm. and a coefficient of elasticity of 0.018 m./nt.m. The pretension in the belt was set at 4.4 nt. and the belt guide rollers 21 and 22 and their support shafts 55 and 56 were constructed to develop a friction force of 0.14 nt. at each guide roller. With this construction only 0.014 nt.m. of driving torque was required to move the tape between the reels, the tape tension, take-up ratio and jitter requirements were met and the acceleration and deceleration and speed requirements were exceeded by 50 percent.

Figure 4:
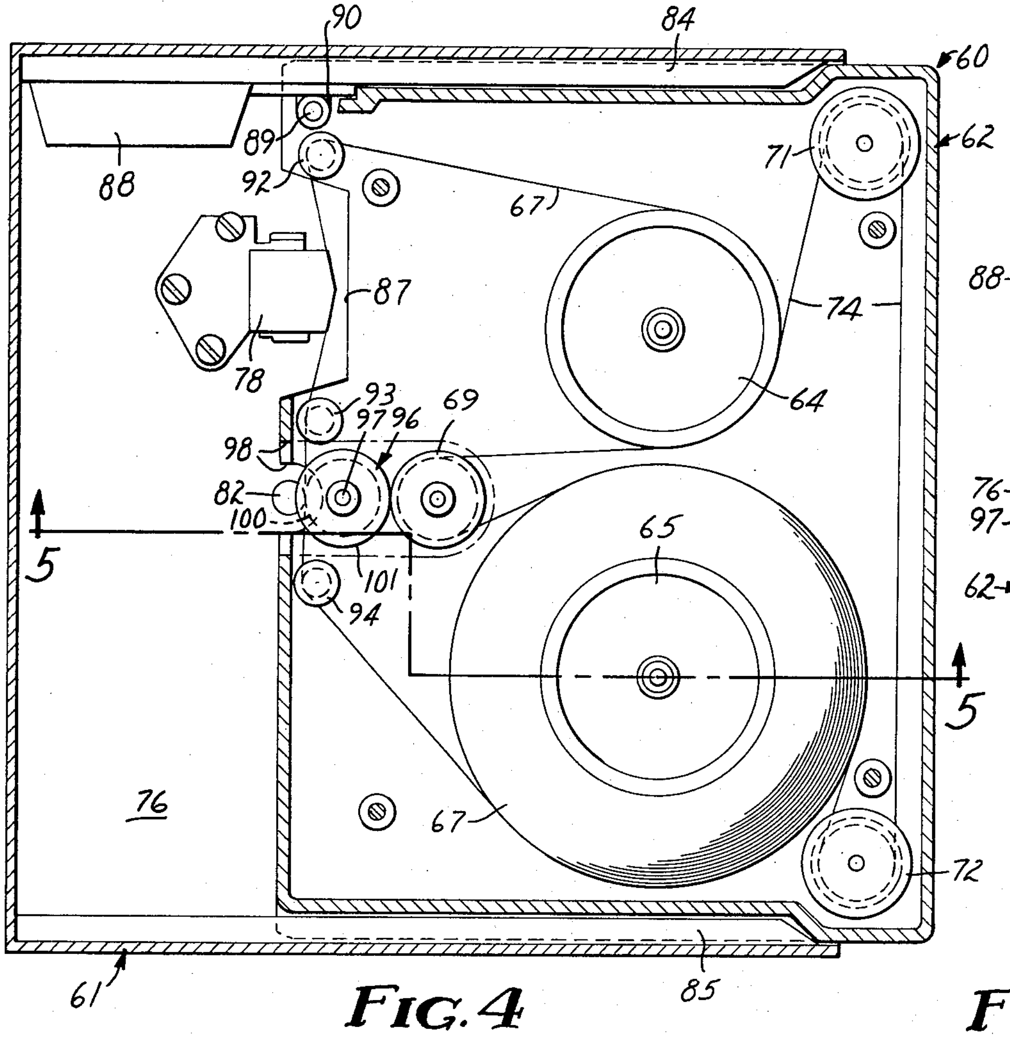
FIG. 4 is a top view of a second embodiment of a belt driven tape cartridge constructed in accordance with the present invention partially in section and in position on a recording and/or reproducing machine.
Figure 6:
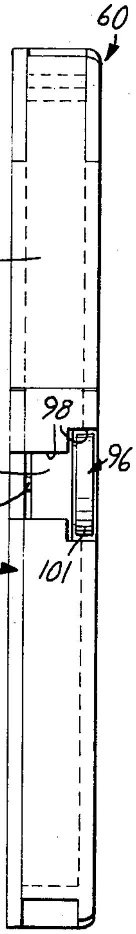
FIG. 6 is an edge view of the cartridge of FIG. 4.
Figure 5:
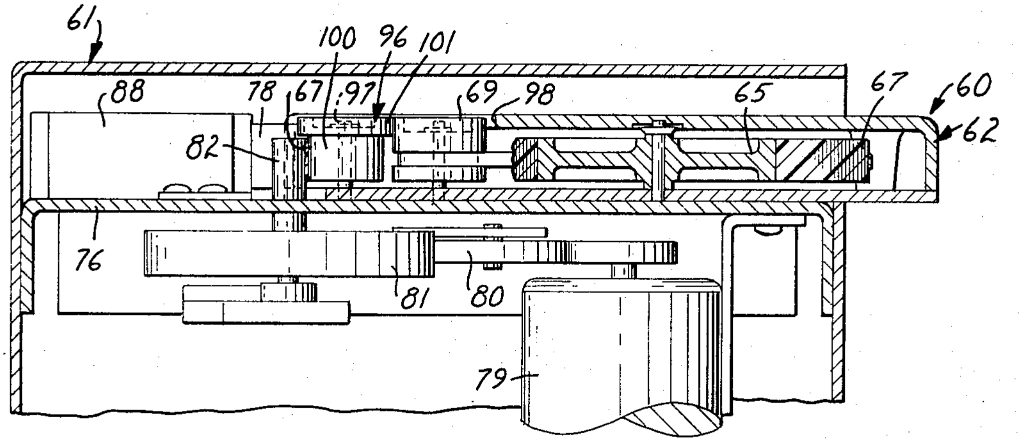
FIG. 5 is a cross-sectional view taken along line 5—5 of FIG. 4.

Referring now to FIGS. 4 through 6, there is illustrated the second embodiment of the tape cartridge, generally designated 60. In FIGS. 4 and 5 the cartridge 60 is shown in position in a recording and/or reproducing machine, generally designated 61. The tape recorder 61 comprises a support frame including a horizontal cartridge support deck 76 supporting a magnetic transducer 78 and in a depending manner supporting a reversible drive motor 79. The drive motor 79 through an idler 80 drives a flywheel 81 and a capstan 92, which capstan extends upward through the support deck 76. Elongate guides 84 and 85 define the position for the cartridge 60 on the cartridge support deck 76.

As in the first embodiment, the cartridge 60 includes a shell 62 defining a thin, generally rectangular enclosure within which are supported a pair of reel hubs 64 and 65, a length of tape 67, a belt driving roller 69, a pair of belt guide rollers 71 and 72, and a driving belt 74. Similarly, the cartridge shell is formed with a cutaway portion 87 for access by a magnetic transducer 78, which cutaway portion is normally covered by a door 88 pivoted on a stud 89. The door 88 is biased toward a closed position by a torsion spring 90 and pivoted to an open position by the cartridge guide 84 in the machine 61 as the cartridge is inserted into the machine in the manner described above with respect to the first embodiment. The tape is guided between the reel hubs 64 and 65 and across the cutaway portion 87 by three guide pins 92, 93 and 94.

The reel hubs 64 and 65, the belt driving roller 69 and the belt guide rollers 71 and 72 are positioned in the same relationship and supported in the same manner as described with reference to the first embodiment and the belt 74 has the same properties as the belt 24 of the first embodiment. However, in this embodiment a drive transfer and pressure roller 96 is positioned on the center line of the cartridge between the belt driving roller 69 and the edge of the cartridge having the cutaway portion 87. To accommodate this additional roller the cartridge shell 62 has a width greater than that of the first embodiment so that the relative positions of the reel hubs 64 and 65, the belt driving roller 69 and the belt guide rollers 71 and 72 remain unchanged. Furthermore, the drive opening 98 extends further into the top wall to accommodate both the belt driving roller 69 and the drive transfer and pressure roller 96 and it extends into the base wall of the cartridge shell to accommodate the capstan 82.

The drive transfer and pressure roller 96 is supported for free rotation on a shaft 97 extending from the base wall of the cartridge shell 62. It is formed with a lesser diameter portion 100 in alignment with the tape path and formed of a resilient material to press the tape 67 against the capstan 82 and a larger diameter portion 101 extending into the drive opening 98 and over the tape path so that it will not contact the tape or the capstan 82. The belt driving roller 69 extends into the drive opening 98 in peripheral contact with the larger diameter portion 101 of the drive transfer and pressure roller 96. As in the first embodiment the belt driving roller 69 and the belt guide rollers 71 and 72 are each formed with a circumferential belt guide slot in alignment with the center line of the tape path so that the belt 74 will contact the tape on the reel hubs 64 and 65 centrally of the width of the tape.

Rotation of the capstan 82 in a clockwise direction (as viewed in FIG. 4) by the drive motor 79 causes the tape to be driven between the capstan and the smaller diameter pressure roller portion 100 of the drive transfer and pressure roller 96 to transfer tape from the reel hub 64 to the reel hub 65. The large diameter portion 101 of the drive transfer and pressure roller 96 transfers the drive to the belt driving roller 69 to rotate the belt driving roller in a clockwise direction (as viewed in FIG. 4) causing the belt 74 to traverse its guide path in a clockwise direction to unwind tape from the reel hub 64 and to take up tape on the reel hub 65. The tape velocity is determined by the peripheral speed of the capstan 82 while the belt velocity is determined by the peripheral speed of the capstan, the radii of the smaller and larger diameter portions of the drive transfer and pressure roller 96, the radius of the belt driving roller 69 and the radius at which the belt 74 contacts the belt driving roller. To provide tension in the tape 67 and to take up tape on the take-up reel, the tape must be unwound from the supply reel 64 by the belt slower than the capstan drives the tape and the tape must be wound on the take-up reel by the belt at least as rapidly as the capstan drives the tape. As described with reference to the first embodiment, the belt tension differential introduced by the belt guide rollers 71 and 72 causes the belt 74 to unwind tape from the supply reel 64 more slowly than it is wound onto the take-up reel 65. Thus, proper supply and take up will be obtained if the radii of the drive transfer and pressure roller 96 and the belt driving roller 69 are properly related to make the peripheral velocity at the radius of the belt driving roller at which the belt contacts it slightly greater than the peripheral velocity of the capstan 82. The ratio of the difference in these peripheral velocities to the peripheral velocity of the capstan (i.e., the percent overdrive to the belt) is preferably equal to the take up ratio to make the tape tension between the capstan and the take-up reel equal to the tape tension between the supply reel and the capstan. As the elasticity of the belt 74 is increased the permissible difference between these peripheral velocities is increased since the take-up ratio also increases. The drive transfer and pressure roller 96 and the belt driving roller 69 may also be supported in spaced relationship and independently driven if the above peripheral velocity relationship is maintained.

As with the first embodiment, the symmetry of the cartridge 60 permits acceleration and deceleration and high speed driving of the tape 67 in either direction between the properties. 64 and 65 with the same drive properteis. Driving of the tape by a capstan drive reduces the effect on the tape movement by jitter produced in the belt thereby increasing the fidelity of recording and/or reproduction. Furthermore, the capstan drive machine 61 may be used to record on the tape 67 and the cartridge 60 may then be transferred to the direct drive machine 11 illustrated in FIGS. 1 and 2 to facilitate high speed reproduction and searching.

Having thus described the present invention, what is claimed is:

1. A tape cartridge comprising:

shell means defining an enclosure having a cutaway portion along one edge, a pair of reel hubs supported for rotation on spaced parallel axes within said enclosure, means defining a tape path within said enclosure extending between said reel hubs along said one edge of said enclosure and across said cutaway portion, a length of tape extending along said tape path, said tape being convolutely wound on said reel hubs in opposite directions about the axes of said reel hubs, a belt driving roller supported within said enclosure for rotation about a stationary axis parallel to the axes of said reel hubs, said driving roller being spaced from said reel hubs and being positioned between said reel hubs toward an edge of said enclosure, a pair of belt guide members supported within said enclosure, said belt guide members being positioned one adjacent each of said reel hubs to define a belt guide path around said belt driving roller and said belt guide members, said belt guide path being spaced from said tape path, passing between said reel hubs from said belt driving roller to each of said belt guide members and having an angle of wrap of at least 60° at the periphery of each said reel hub, a thin, continuous, flexible, elastic belt extending along said belt guide path and contacting said tape on said reel hubs, said belt having a coefficient of elasticity in the range from 0.01 to 0.25 m./nt.m. and a pretension of at least 1.6 nt., and frictional means for applying a predetermined drag on said belt as it is moved along said belt guide path to provide a take-up ratio of at least 0.001 m./m., said frictional means engaging said belt in the portion of said belt guide path from the contact of said belt with said tape on one of said reel hubs around said guide members to the contact of said belt with said tape on the other of said reel hubs.

2. The tape cartridge of claim 1 wherein said frictional means comprises means for applying said drag at said belt guide members.

3. The tape cartridge of claim 1 wherein said pair of belt guide members and said frictional means for applying a predetermined drag on said belt comprise a pair of belt guide rollers each supported on a stationary shaft and having a predetermined frictional coupling therewith.

4. The tape cartridge of claim 1 wherein said belt driving roller is positioned adjacent said one edge of said shell means, is formed with a smaller diameter belt guide portion in alignment with and spaced from said tape path and a larger diameter portion extending over said tape path, and wherein said shell means is formed with a drive opening for access to said larger diameter portion of said belt driving roller by a drive roller.

5. The tape cartridge of claim 1 including a pressure roller formed for engagement by a capstan shaft and supported for rotation by said shell means in alignment with and adjacent said tape path along said one edge of said shell means and wherein said shell means is formed with a drive opening for access by a capstan shaft to drive said tape against said pressure roller.

6. The tape cartridge of claim 5 wherein said belt driving roller is supported in peripheral contact with said pressure roller to be driven thereby and wherein the radii of said pressure roller and said belt driving roller are related to make the peripheral velocity of said belt driving roller at the radius thereof at which it drives said belt greater than the peripheral velocity of aid said roller at the radius thereof formed for engagement by a said capstan shaft.

7. A tape cartridge comprising:

shell means defining an enclosure having a cutaway portion along one edge, a pair of reel hubs supported for rotation on spaced parallel axes within said enclosure, means defining a tape path within said enclosure extending between said reel hubs along said one edge of said enclosure and across said cutaway portion, a length of tape extending along said tape path, said tape being convolutely wound on said reel hubs in opposite directions about the axes of said reel hubs, a belt driving roller supported within said enclosure for rotation about a stationary axis parallel to the axes of said reel hubs, said driving roller being spaced from said reel hubs and being positioned on a line perpendicularly bisecting a line joining the axes of said reel hubs, a pair of belt guide members supported within said enclosure, said belt guide members being similarly positioned one adjacent each of said reel hubs to define a belt guide path around said belt driving roller an said belt guide members, said belt guide path being spaced from said tape path, passing between said reel hubs from said belt driving roller to each of said belt guide members and having an angle of wrap of at least 60° at the periphery of each said reel hub, a thin, continuous, flexible, elastic belt extending along said belt guide path and contacting said tape on said reel hubs, said belt having a coefficient of elasticity in the range from 0.01 to 0.25 m./nt.m. and a pretension of at least 1.6 nt., and frictional means for applying a predetermined drag on said belt as it is moved along said belt guide path to provide a take-up ratio of at least 0.001 m./m., said frictional means engaging said belt in the portion of said belt guide path from the contact of said belt with said tape on one of said reel hubs around said guide members to the contact of said belt with said tape on the other of said reel hubs.

8. The tape cartridge of claim 7 wherein said frictional means comprises means for applying said drag at said belt guide members.

9. The tape cartridge of claim 7 wherein said pair of belt guide members and said frictional means for applying a predetermined drag on said belt comprise a pair of belt guide rollers each supported on a stationary shaft and having a predetermined frictional coupling therewith.

10. The tape cartridge of claim 7 wherein said belt driving roller is positioned adjacent said one edge of said shell means, is formed with a smaller diameter belt guide portion in alignment with and spaced from said tape path and a larger diameter portion extending over said tape path, and wherein said shell means is formed with a drive opening for access to said larger diameter portion of said belt driving roller by a drive roller.

11. The tape cartridge of claim 7 including a pressure roller formed for engagement by a capstan shaft and supported for rotation by said shell means in alignment with and adjacent said tape path along said one edge of said shell means and wherein said shell means is formed with a drive opening for access by a capstan shaft to drive said tape against said pressure roller.

12. The tape cartridge of claim 11 wherein said belt driving roller is supported in peripheral contact with said pressure roller to be driven thereby and wherein the radii of said pressure roller and said belt driving roller are related to make the peripheral velocity of said belt driving roller at the radius thereof at which it drives said belt greater than the peripheral velocity of said pressure roller at the radius thereof formed for engagement by a said capstan shaft.

* * * * *

UNITED STATES PATENT OFFICE

CERTIFICATE OF CORRECTION

Patent No. 3,692,255 Dated September 19, 1972

Inventor(s) Robert A. vonBehren

It is certified that error appears in the above-identified patent and that said Letters Patent are hereby corrected as shown below:

Column 3, line 59, change "mt." to -- nt. --.

Column 6, line 11, change "92" to -- 82 --.

Column 7, line 52, delete "properties." and in its place insert -- reels --; and
line 53, change "properteis" to -- properties --.

Column 9, line 2, delete "aid" and after "said" insert -- pressure --.

Column 9, line 26, change "an" to -- and --.

Signed and sealed this 13th day of February 1973.

(SEAL)
Attest:

EDWARD M.FLETCHER,JR.
Attesting Officer

ROBERT GOTTSCHALK
Commissioner of Patents